(12) United States Patent
Dyson et al.

(10) Patent No.: US 11,859,791 B2
(45) Date of Patent: Jan. 2, 2024

(54) LIGHTING DEVICE

(71) Applicant: Dyson Technology Limited, Wiltshire (GB)

(72) Inventors: Jacob Dyson, Bath (GB); William John Darvill, Bristol (GB); Ishay Halmut, Bristol (GB); Anthony James Hall, Bristol (GB); Davide Leoni, Bristol (GB); Faye Webber, Cirencester (GB); Simon Christopher Davey, Swindon (GB)

(73) Assignee: Dyson Technology Limited, Malmesbury (GB)

( * ) Notice: Subject to any disclaimer, the term of this patent is extended or adjusted under 35 U.S.C. 154(b) by 184 days.

(21) Appl. No.: 17/621,156

(22) PCT Filed: Apr. 17, 2020

(86) PCT No.: PCT/GB2020/050965
§ 371 (c)(1),
(2) Date: Dec. 20, 2021

(87) PCT Pub. No.: WO2020/260850
PCT Pub. Date: Dec. 30, 2020

(65) Prior Publication Data
US 2022/0357001 A1    Nov. 10, 2022

(30) Foreign Application Priority Data

Jun. 24, 2019   (GB) ..................... 1909010

(51) Int. Cl.
*F21S 6/00*       (2006.01)
*F21V 14/02*      (2006.01)
(Continued)

(52) U.S. Cl.
CPC ............. *F21S 6/005* (2013.01); *F21V 14/02* (2013.01); *F21V 17/02* (2013.01); *F21V 21/26* (2013.01);
(Continued)

(58) Field of Classification Search
CPC .. F21S 6/005; F21S 6/003; F21S 6/008; F21S 10/026; F21S 10/005; F21V 17/02;
(Continued)

(56) References Cited

U.S. PATENT DOCUMENTS 2,048,313 A    7/1936 Adolfson
2,164,390 A    7/1939 Dickerson
(Continued)

FOREIGN PATENT DOCUMENTS

CN    201062733 Y    5/2008
CN    201351829 Y    11/2009
(Continued)

OTHER PUBLICATIONS

Office Action received for Chinese Patent Application No. 201980050060.5, dated Jul. 27, 2022, 16 pages (9 pages of English Translation and 7 pages of Original Document).
(Continued)

*Primary Examiner* — Erin Kryukova
(74) *Attorney, Agent, or Firm* — Faegre Drinker Biddle & Reath LLP

(57) ABSTRACT

A lighting device includes a light permeable body which has an aperture through which light enters the body. A light source is moveable relative to the body to enable the lighting device to adopt selectively one of a first configuration and a second configuration. In the first configuration, the light source is positioned over the aperture so that light emitted by the light source passes through the body before illuminating the room. In the second configuration, the light source is
(Continued)

spaced laterally from the aperture so that the room is illuminated directly by light emitted from the light source.

26 Claims, 13 Drawing Sheets

(51) Int. Cl.
    *F21V 17/02*         (2006.01)
    *F21V 21/26*         (2006.01)
    *F21Y 115/10*       (2016.01)
    *F21V 17/10*         (2006.01)

(52) U.S. Cl.
    CPC ............... *F21S 6/003* (2013.01); *F21S 6/008* (2013.01); *F21V 17/105* (2013.01); *F21V 2200/00* (2015.01); *F21Y 2115/10* (2016.08)

(58) Field of Classification Search
    CPC ........ F21V 21/26; F21V 14/02; F21V 17/105; F21V 2200/00; F21V 14/06; F21V 21/28; F21Y 2115/10
    See application file for complete search history.

(56) References Cited

U.S. PATENT DOCUMENTS

| | | | |
|---|---|---|---|
| 2,242,303 A | 5/1941 | Irmischer | |
| 2,488,898 A | 11/1949 | Brasty | |
| 2,665,330 A | 1/1954 | Wong | |
| 3,164,355 A | 1/1965 | Seitz et al. | |
| 3,983,386 A | 9/1976 | Schallenkammer | |
| 4,121,280 A | 10/1978 | Chapman et al. | |
| 4,347,557 A | 8/1982 | Warshawsky | |
| 4,381,538 A | 4/1983 | Warshawsky | |
| 4,449,169 A | 5/1984 | Warshawsky | |
| 4,692,849 A | 9/1987 | Le Vantine | |
| 4,726,552 A | 2/1988 | Warshawsky | |
| 4,821,159 A | 4/1989 | Pike | |
| 4,880,193 A | 11/1989 | Warshawsky | |
| 5,097,400 A | 3/1992 | Cvek | |
| 5,342,137 A | 8/1994 | Peng | |
| 6,398,172 B1 | 6/2002 | Rousek et al. | |
| 7,938,560 B2 | 5/2011 | Hsu | |
| 8,002,448 B2 | 8/2011 | Chen | |
| 9,274,210 B2 | 3/2016 | Enge et al. | |
| 9,477,029 B2 | 10/2016 | Parker et al. | |
| 9,605,800 B2 | 3/2017 | Huang et al. | |
| 9,950,662 B2 | 4/2018 | Moon | |
| 2004/0062048 A1 | 4/2004 | Eusterbrock | |
| 2004/0125597 A1 | 7/2004 | Einav | |
| 2008/0232107 A1* | 9/2008 | Hsu | F21V 7/0025 362/277 |
| 2009/0225558 A1 | 9/2009 | Atkinson | |
| 2009/0284975 A1 | 11/2009 | Querci | |
| 2009/0318770 A1 | 12/2009 | Marka et al. | |
| 2011/0141737 A1 | 6/2011 | Gu et al. | |
| 2011/0228538 A1 | 9/2011 | Yu et al. | |
| 2014/0133172 A1* | 5/2014 | Vissenberg | F21V 14/06 362/555 |
| 2016/0369959 A1* | 12/2016 | Ngai | F21V 7/0058 |
| 2017/0261191 A1 | 9/2017 | Kawachi et al. | |
| 2018/0058647 A1 | 3/2018 | He et al. | |
| 2018/0160891 A1 | 6/2018 | Ahearn et al. | |
| 2019/0056094 A1 | 2/2019 | Dyson et al. | |
| 2019/0145473 A1 | 5/2019 | Puterbaugh et al. | |
| 2021/0254817 A1 | 8/2021 | Dyson et al. | |
| 2021/0325009 A1 | 10/2021 | Dyson et al. | |

FOREIGN PATENT DOCUMENTS

| | | | |
|---|---|---|---|
| CN | 101806994 A | | 8/2010 |
| CN | 102094894 A | | 6/2011 |
| CN | 102997105 A | | 3/2013 |
| CN | 103133967 A | * | 6/2013 |
| CN | 103133967 A | | 6/2013 |
| CN | 105927894 A | | 9/2016 |
| CN | 106594570 A | | 4/2017 |
| CN | 206592990 U | | 10/2017 |
| CN | 206943903 U | | 1/2018 |
| CN | 207094300 U | | 3/2018 |
| CN | 207112466 U | | 3/2018 |
| DE | 19516758 A1 | | 11/1996 |
| DE | 102007058173 A1 | | 6/2009 |
| JP | 2009-087765 A | | 4/2009 |
| JP | 2011-204497 A | | 10/2011 |
| JP | 2011204497 A | * | 10/2011 ................ F21S 2/00 |
| JP | 2013-110015 A | | 6/2013 |
| JP | 5709360 B2 | | 4/2015 |
| WO | 2011/118354 A1 | | 9/2011 |
| WO | 2014/074073 A1 | | 5/2014 |

OTHER PUBLICATIONS

Notification of Reason(s) for Refusal received for Korean Patent Application No. 10-2021-7007525, dated Mar. 30, 2023, 12 pages (6 pages of English Translation and 6 pages of Original Document).
Examination Report under Section 18(3) received for GB Patent Application No. 1909010, dated May 27, 2021, 2 pages.
International Search Report and Written Opinion received for PCT Patent Application No. PCT/GB2019/052155, dated Sep. 6, 2019, 12 pages.
International Search Report and Written Opinion received for PCT Patent Application No. PCT/GB2019/052156, dated Sep. 6, 2019, 13 pages.
International Search Report and Written Opinion received for PCT Patent Application No. PCT/GB2020/050965, dated Jun. 10, 2020, 14 pages.
Search Report dated Feb. 13, 2019, directed to GB Application No. 1814190.3; 1 page.
Search Report dated Feb. 13, 2019, directed to GB Application No. 1814191.1; 2 pages.
Search Report received for GB Application No. 1909010, dated Dec. 18, 2019, 1 page.
Office Action received for Chinese Patent Application No. 202080046453.1, dated Aug. 1, 2023, 13 pages (7 pages of English Translation and 6 pages of Original Document).

* cited by examiner

LIGHTING DEVICE

CROSS-REFERENCE TO PRIOR APPLICATION

This application is a § 371 National Stage Application of PCT International Application No. PCT/GB2020/050965 filed Apr. 17, 2020, which claims priority to United Kingdom Application No. 1909010.9, filed Jun. 24, 2019, each of which are herein incorporated by reference in their entirety.

FIELD OF THE INVENTION

The present invention relates to a lighting device and in a particular to a multi-functional lighting device in which the lighting device may be placed in one of a number of different configurations.

BACKGROUND OF THE INVENTION

Floor-standing, desk-standing and wall-mounted lamps for illuminating a task area include the well-known Anglepoise® lamp, in which a light source is mounted on an articulated support. The support comprises a first arm which is pivotably mounted to a stand, and a second arm which is pivotably mounted to the first arm. The light source is mounted to an end of the second arm for pivoting movement relative thereto. Each of the pivot axes is generally parallel, and together enable the lamp to be placed in a range of different configurations for optimising the illumination of a task area located beneath the light source.

SUMMARY OF THE INVENTION

The present invention provides a lighting device comprising:
- a body having an aperture through which light enters the body;
- a light source moveable relative to the body to enable the lighting device to adopt selectively one of a first configuration in which the light source is positioned to illuminate the interior of the body, and a second configuration in which the light source is laterally spaced from the aperture; and
- a light guide moveable relative to the body between a stowed position and a deployed position to guide into the body light emitted from the light source when the device is in its first configuration.

The body is preferably a light permeable body. When the light source is positioned to illuminate the interior of the light permeable body, the lighting device is placed in a first, or "room lighting", configuration, in which a room or other external environment is illuminated by light which has passed through the light permeable body. Depending on the material from which the light permeable body is formed, or the colour of any filter located within the light permeable body, this can enable the room to be illuminated by a relatively warm and/or diffuse light emitted from the external surface of the light permeable body. When the light source is moved to a position which is remote from the light permeable body, the lighting device is placed in a second, or "task lighting", configuration, in which a room, task area or other work surface is illuminated directly by light emitted from the light source. This can enable the task area to be illuminated by a relatively cool and/or intense light emitted by the light source.

In the first configuration of the lighting device, the light source is positioned so as to illuminate the interior of the light permeable body. In this configuration, the light source is preferably arranged external to the light permeable body to facilitate a rapid transition between the configurations of the lighting device. The light permeable body is preferably hollow, and in one embodiment is in the form of a pipe or tube having an internal surface which is illuminated by the light source. The tube may have a regular or irregular cross-section, which may be constant or varying along the length of the tube. For example, where the tube has a circular cross-section, the tube may be cylindrical or frusto-conical in shape. Where the tube has a regular cross-section, the light source preferably has the same or a similar external diameter or shape as the body so that the body and the light source present a uniform appearance when the lighting device is in its first configuration.

The light permeable body preferably comprises an open end which defines the aperture through which light can enter the body, and in the first configuration of the lighting device the light source is preferably positioned over the open end of the body. This allows the light source to illuminate the interior of the body, with the light received by the body passing through the body prior to emission from the body.

When the lighting device is in the first configuration, it is desirable to maximise the amount of light which enters the body from the light source, and so minimise the amount of light which does not enter the interior of the body from the light source. Whilst positioning the light source so as to engage the open end of the body when the device is in its first configuration can enhance the amount of light which enters the body from the light source, it can be subject to the provision of tight engineering tolerances, and can lead to wear of at least one of the light source and the body over time. Instead, in accordance with the present invention the lighting device comprises a light guide which is moveable relative to the body between a stowed position and a deployed position to guide light emitted from the light source into the body when the device is in its first configuration. This can allow the light source to be longitudinally spaced from the body, and so moveable freely between its different configurations without engaging the body, yet maximise the amount of light which enters the body from the light source.

The light guide is preferably supported by, or mounted on, one of the body and the light source. For example, the light guide may be mounted on the light source. The light guide may be in the form of a sleeve which, in its stowed position, surrounds the light source, and which is moveable relative to the light source to a deployed position in which the light guide extends around the longitudinal gap between the light source and the body to guide light emitted from the light source into the body.

The light guide may be moveable manually between its stowed and deployed positions when the lighting device is in its first configuration. For example, the light guide may be arranged to slide over the external surfaces of the light source and the body as it moves between its stowed and deployed positions.

The light guide may be formed from elastic material to enable the light guide to grip the external surfaces of the light source and body when in its deployed position. Alternatively, the light guide may be formed from rigid material, and the lighting device may comprise means for retaining the light guide in a selected one of its stowed and deployed positions. For example, the light source may comprise a catch for retaining the light guide in its stowed position, and for releasing the light guide to enable it to be moved to its deployed position.

Alternatively, the light guide may be mounted on, or supported by, the body. Analogous to the above example, the light guide may be in the form of a sleeve which, in its stowed position, surrounds the body, and which is moveable relative to the body to a deployed position in which the light guide extends around the longitudinal gap between the light source and the body to guide light emitted from the light source into the body. Again, the light guide may be moveable manually between its stowed and deployed positions when the lighting device is in its first configuration. For example, the light guide may be arranged to slide over the external surfaces of the light source and the body as it moves between its stowed and deployed positions.

This light guide may also be formed from elastic material to enable the light guide to grip the external surfaces of the light source and body when in its deployed position. Alternatively, the light guide may be formed from rigid material, and the lighting device may comprise means for retaining the light guide in a selected one of its stowed and deployed positions.

In a preferred embodiment, the light guide is supported by the body when in its stowed position, and is preferably located at least partially within the body when in its stowed position. The light guide is preferably located substantially fully within the body when in its stowed position. As discussed above, the body preferably has an open end, which in a preferred embodiment is an open upper end, and a lower end located opposite to the upper end. The upper end is preferably substantially vertically above the lower end, that is, so that each end of the body is positioned substantially centrally on a vertical longitudinal axis of the body. In its stowed position, the light guide is preferably located beneath the open end of the body.

As the light guide moves from its stowed position to its deployed position, the light guide preferably moves towards the light source. Thus, when in its deployed position, the light guide preferably protrudes from the open end of the body to guide light emitted from the light source into the body.

The lower end of the body is preferably closed, and is preferably located adjacent to, or closed by, a base of the device. The base may be wall-mountable, desk-mountable or floor-standing. The body or the base may comprise additional functionality of the lighting device, such as one or more of a USB charger and a proximity sensor. The open end and the closed end of the body are preferably substantially parallel and orthogonal to the longitudinal axis of the body.

The body may be formed entirely from translucent material, but alternatively the body may comprise one or more translucent sections. The translucent sections may be formed from glass or plastics material, such as polycarbonate. Alternatively, the body may be perforated, or may comprise one or more perforated sections. The perforated body, or the perforated sections of the body, may be formed from metallic or plastics material. As a further alternative, the body may comprise a translucent tube or pipe and a perforated sleeve which extends about, or surrounds the tube, and which comprises at least one perforated section. This can allow perforations to be distributed as required about the external surface of the body to produce the desired lit effect when the device is in its first configuration, with the (inner) tube providing structural stability to the body. The translucent tube may be formed from plastics material, such as a polycarbonate material, and the sleeve may be formed from an opaque plastics or metallic material. When the light guide is in its stowed position, it is preferably located between the open end of the body and the perforated section(s) of the body.

The light source preferably comprises a light emitting device and a baffle defining an aperture through which light is emitted from the light source. In this embodiment, when in its deployed position the light guide preferably engages the baffle to guide light emitted from the light source into the body. As mentioned above, the light guide may extend about at least part of the light source, for example, a lower portion of the baffle, when in its deployed position so as to surround the aperture of the baffle.

In a preferred embodiment, the light guide is arranged to engage a wall of the light source which faces towards the body when the device is in its first configuration. This wall is preferably an annular wall of the baffle which defines the aperture through which light is emitted from the light source. The annular wall may have a circular inner periphery and/or a circular outer periphery. Alternatively, the annular wall may have one or more regular or irregular polygonal peripheries. The light guide preferably comprises an annular wall for engaging the light source. The annular wall of the light guide may have a similar or a dissimilar shape to the annular wall of the baffle. The light guide preferably comprises a tubular inner wall depending from an inner periphery of the annular wall for guiding light into the body. The inner wall is preferably cylindrical in shape, but it may have a non-circular cross-section, such as an elliptical cross-section, or a regular or irregular polygonal cross-section. To inhibit the re-emission of light from around the outer periphery of the annular wall, the light guide preferably further comprises a tubular outer wall depending from the outer periphery of the annular wall and which slides along an inner surface of the body as the light guide moves between its stowed position and its deployed position.

The body preferably comprises a ledge for supporting the light guide when in its stowed position, the light guide moving away from the ledge as it moves towards its deployed position. The ledge may be connected to, or supported by, the inner tube of the body, or it may be connected to, or integral with, the perforated sleeve of the body. The ledge is preferably annular in shape. Alternatively, the ledge may comprises a plurality of sections spaced about the body. The light source rests on the ledge when in its stowed position, and moves away from the ledge when in its deployed position.

The device preferably comprises means for urging the light guide towards its deployed position as the lighting device adopts its first configuration. This can enable the light guide to move automatically towards its deployed position as the lighting device adopts its first configuration. The urging means may comprise an elastically-biased mechanism which urges the light guide against the baffle as the device adopts its first configuration. Preferably, the urging means is configured to magnetically attract the light guide towards its extended position as the lighting device adopts its first configuration. For example, one of the light source and the light guide may comprise at least one permanent magnet, and the other of the light source and the light guide may be formed from, or include a component which is formed from, ferromagnetic material which is attracted towards the permanent magnet(s). Alternatively, the other of the light source and the light guide may also comprise at least one permanent magnet which is of opposite polarity to the magnet(s) of said one of the light source and the light guide. In a preferred embodiment, the light source comprises a pair of permanent magnets, and the light guide comprises a pair of permanent magnets which are attracted towards the permanent magnets of the light source as the device adopts its first configuration. The strength of the magnetic fields of the permanent magnets is preferably such that the light guide rises to its deployed position, and becomes attached to the light source through magnetic attraction, only when the light source is in its first configuration, and so falls back to its stowed position as the device moves away from its first configuration. This can reduce the risk of the light guide inhibiting the movement of the device to its first configuration through premature movement to its deployed position.

The lighting device preferably comprises a support which supports the light source. The light source may be moveable along the support as the lighting device adopts different configurations. For example, the light source may be slid along the support by the user from a position in which the interior of the body is illuminated by the light source to a position in which a task area is illuminated directly by the light source. Alternatively, the support may be moveable relative to the light permeable body to adjust the configuration of the lighting device. The support may be flexible, and may be bent, twisted or otherwise changed in shape to move the light source relative to the body. As another alternative, the support may be translatable relative to the body. For example, the support may be slidable so that the light source moves relative to the body along a linear or curved path. As a further alternative, the support may be pivotable so that the light source may be moved along an arcuate or circular path. A pivoting support is preferable as the user only has to swing the support relative to the body in order to adjust the configuration of the lighting device.

The support may be connected to the base so as to be spaced from the body, and the support may be moveable relative to the base, and to the body, so as to change the configuration of the lighting device. The support may be pivotable relative to the body about a pivot axis which is substantially parallel to a longitudinal axis of the body. As the lighting device moves from the first configuration to a second configuration, an arc which is swept by the support may thus be located in a plane which is orthogonal to the longitudinal axis of the body, and which is parallel to a plane containing the longitudinal axis of the support.

In a preferred embodiment, the support is in the form of an articulated support which is connected to the body. The support extends outwardly from the body, preferably substantially orthogonally to the longitudinal axis of the body. The support is preferably connected to the body adjacent to the open end or aperture of the body. The support preferably comprises a first arm which is connected to the body, and a second arm which supports the light source, and which is moveable relative to the first arm. The second arm is preferably pivotable relative to the first arm about a pivot axis which is substantially parallel to the longitudinal axis of the body. The arms of the support are preferably arranged such that when the lighting device is in its first configuration, the arms of the support are substantially parallel, with the second arm overlying the first arm. In a fully extended second configuration of the device, the arms of the support are preferably in a substantially linear arrangement to maximise the distance between the light source and the body. Again, as the second arm moves to change the configuration of the lighting device, an arc which is swept by the second arm is preferably located in a plane which is orthogonal to the longitudinal axis of the body, and which is parallel to a plane containing the longitudinal axis of the second arm.

The body may be rotatable relative to the base. This can allow the direction in which the first arm protrudes from the support relative to the base to be adjusted, which in turn can increase the number of different positions which the light source may adopt relative to the base when the lighting device is in a task lighting configuration. The body is preferably rotatable about its longitudinal axis. Alternatively, the support may be mounted on the body so that the first arm is rotatable relative to the body about the longitudinal axis of the body. In both of these alternatives, the support is rotatable relative to the base about the longitudinal axis of the body. The longitudinal axis of the body preferably passes through the end of the support which is connected to the body, and so the support is preferably rotatable relative to the base about an axis which passes through the end of the support, and which is preferably orthogonal to the support.

The light source may be locatable in one of two different positions relative to the body; a first position when the lighting device is in the first configuration, and a second position when the lighting device is in the second configuration. These first and second positions may be located at either end of the extremity of the movement of the light source relative to the body. A biasing mechanism may be provided for urging the light source towards one of its first and second positions depending on the current position of the light source relative to the body.

Alternatively, the light source may adopt one of a range of different second positions relative to the body, and so the lighting device may adopt a range of different second, or task lighting, configurations. The user can choose the position to be adopted by the light source depending on, for example, the location of the task area relative to the body. The arms of the support may be arranged to move freely relative to the base so that the user can locate the light source at any desired position on the path along which the light source moves relative to the base. In order to reduce the likelihood of the light source being moved inadvertently once positioned by the user, the lighting device may include an indexing mechanism for moving the light source relative to the body between different positions in a series of step movements. For example, the lighting device may include a rack and pinion mechanism or a cam mechanism for moving the light source between different positions. The rack gear may be straight or curved. Alternatively, the lighting device may comprise means for fastening the second arm to the first arm to inhibit relative movement between the arms of the support. For example, the lighting device may comprise a bolt or grub screw for fastening the second arm to the first arm.

The lighting device comprises means for retaining the second arm in one of a number of positions relative to the first arm. For example, the lighting device may comprise a detent connected to the second arm so as to move with the second arm relative to the first arm, which enters one of a number of recesses provided on a component connected to the first arm as the second arm moves relative to the first arm to retain the second arm relative to the first arm.

The support preferably comprises a joint section for connecting the second arm to the first arm. The joint section is preferably mounted on a spigot upstanding from the end of the first arm which is remote from the body, so that the joint section and the second arm rotate together about the pivot axis. This spigot may be located directly on the first arm, or located on another joint section which is connected to the end of the first arm which is remote from the body.

A biasing mechanism may be provided for urging the lighting device towards its first configuration depending on the position of the light source relative to the body. The biasing mechanism may be arranged to contact the second arm to move the lighting device into its first configuration. In a preferred embodiment, the biasing mechanism is arranged to engage the joint section to move the lighting device into its first configuration depending on the position of the light source relative to the body, and more preferably depending on the angular position of the second arm relative to the first arm. In a preferred embodiment, the biasing mechanism comprises a detent which is mounted on the first arm, and which is biased towards the joint section. A spring or other resilient member may be provided for urging the detent towards the joint section. The joint section may comprise a track or groove, preferably a circular groove, which extends about the pivot axis, and which is engaged by the detent. A recess is preferably formed in the groove, the recess being shaped to receive the detent depending on the angular position of the second arm relative to the first arm. The recess is preferably curved or concave in shape. The detent preferably comprises a circular roller which engages, and is urged towards, the groove. As the lighting device moves towards the first configuration, the detent enters the recess in the groove to urge the lighting device into its first configuration to ensure accurate alignment between the light source and the body in that configuration of the lighting device.

In a preferred embodiment, the second arm is also moveable relative to the joint section. This can further increase the number of different positions and/or orientations which the light source may adopt relative to the body when the lighting device is in a task lighting configuration.

In the first configuration of the lighting device, the light source is oriented relative to the body so that an optical axis of the light source is preferably substantially parallel to the longitudinal axis of the body. When in a task lighting configuration, the light source may remain in this orientation relative to the body. Alternatively, the second arm may be moved relative to the joint section about a third axis which is angled to, and preferably orthogonal to, the second axis. This allows the orientation of the light source to be adjusted. The second arm is preferably rotatable about the third axis, preferably through at least 180°, more preferably through at least 270°, and in a preferred embodiment through around 360°. This can allow the orientation of the optical axis of the light source relative to the body to be adjusted so that the lighting device may adopt either a "downlighting" configuration for illuminating a work surface or task area, or an "uplighting" configuration for general room illumination by reflection of light, emitted directly by the light source, from secondary room surfaces such as walls and/or a ceiling. The optical axis of the light source may also be angled, or inclined, relative the longitudinal axis of the body when in a downlighting configuration, for example to optimise the illumination of reading material or other task area, or when in an uplighting configuration, for example to optimise the illumination of a wall or other secondary room surface. These may be referred to as angled configurations of the lighting device.

The third axis preferably intersects the second axis, preferably substantially orthogonally. The third axis is preferably parallel to a longitudinal axis of the second arm.

The biasing means preferably comprises means for urging the light source towards an orientation such that the optical axis of the light source is substantially parallel to the longitudinal axis of the body. For example, the light source urging means may comprise a mechanism for engaging the second arm to rotate the second arm about the third axis as the device approaches its first configuration. This mechanism may be located on the first arm. Alternatively, the light source urging means may be configured to magnetically urge the light source towards said orientation. In a preferred embodiment, the light source urging means comprises a first permanent magnet connected to the first arm, and a second permanent magnet connected to the second arm, the second magnet being of opposite polarity to the first magnet. As the device approaches its first configuration, the second magnet becomes attracted to the first magnet, which causes the orientation of the second arm to adjust so that the optical axis of the light source is substantially parallel to the longitudinal axis of the body.

The support is preferably mounted on a body which is rotatable relative to the base. The body is preferably rotatable relative to the base about its longitudinal axis. The support preferably extends substantially orthogonal to the longitudinal axis of the body.

The terms "horizontal", "vertical", "laterally", "upper" and "lower" are used in the context of the present application to refer to relative orientations or positions of components of the lighting device when in normal use.

The moveable light guide may be used in optical devices other than lighting devices in which one of a number of different bodies, such as light pipes, may be selectively illuminated with light emitted from a light source, and so in a second aspect the present invention provides an optical device comprising:

a body having an aperture through which light enters the body;

a light source;

means for effecting relative movement between the light source and the body to enable the device to adopt selectively one of a first configuration in which the light source is positioned to illuminate the interior of the body, and a second configuration in which the light source is laterally spaced from the aperture; and a light guide moveable relative to the body between a stowed position and a deployed position to guide into the body light emitted from the light source when the device is in its first configuration. The means for effecting relative movement may comprise a support for moving the light source relative to the body, or a mechanism, such as a moveable support, for moving the body relative to the light source Features described above in connection to the first aspect of the invention are equally applicable to the second aspect of the invention, and vice versa.

BRIEF DESCRIPTION OF THE DRAWINGS

Preferred features of the invention will now be described, by way of example only, with reference to the accompanying drawings, in which.

DETAILED DESCRIPTION OF THE INVENTION

Figure 1:
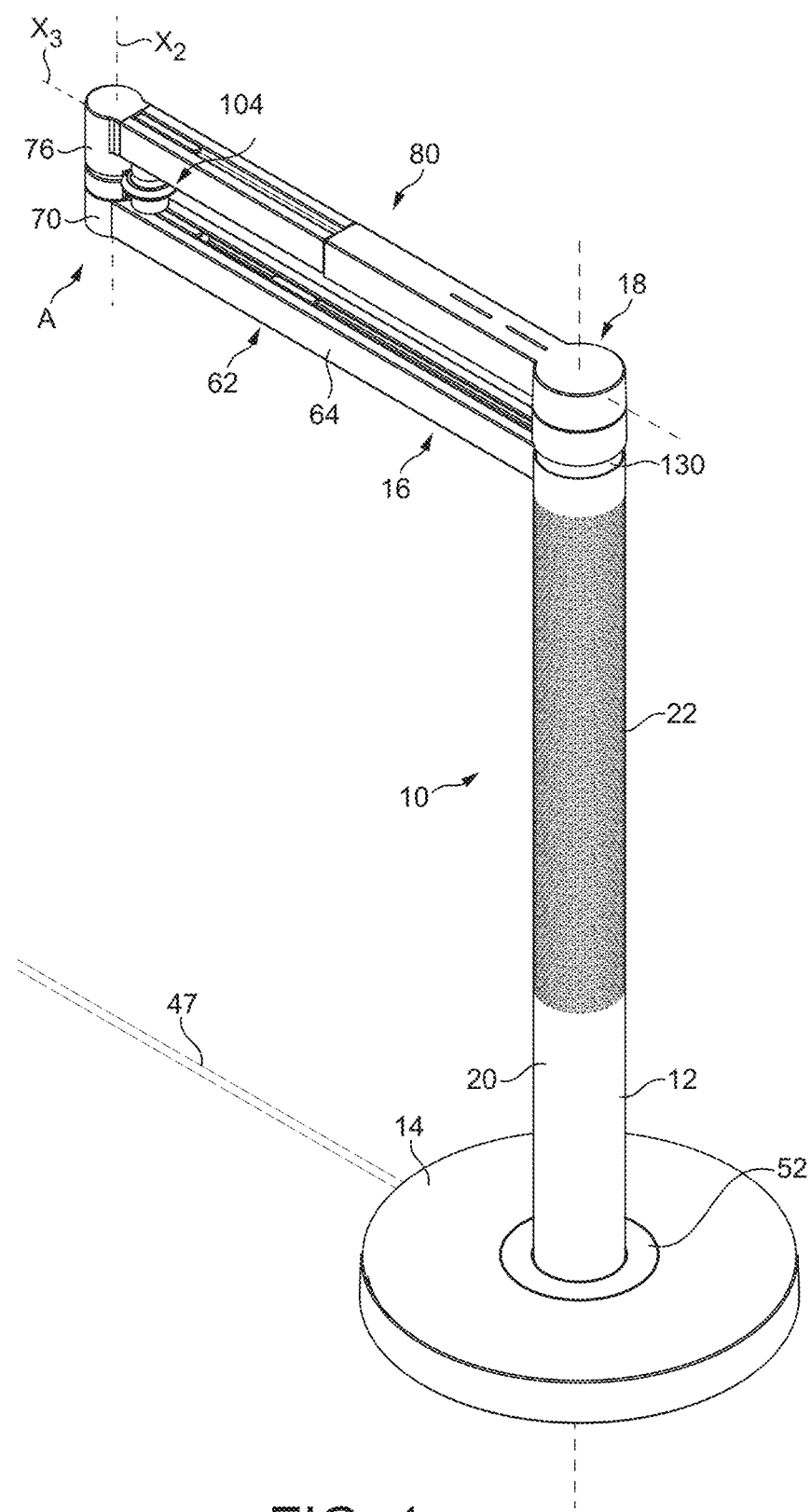
FIG. 1 is a perspective view, from above, of a lighting device, in which the lighting device is in a room lighting configuration.

An embodiment of a lighting device 10 of the present invention will be described with reference to FIGS. 1 to 16. In this embodiment, the lighting device 10 is in the form of a desk lamp, but alternative embodiments include a floor-standing lamp and a wall-mounted light. In overview, the lighting device 10 comprises a body 12 mounted on a base 14, a support 16 connected to the body 12, and a light source 18 which is supported by the support 16. The support 16 is articulated, which allows a user to move the light source 18 relative to the body 12 to allow the lighting device 10 to adopt a range of different configurations.

Figure 3:
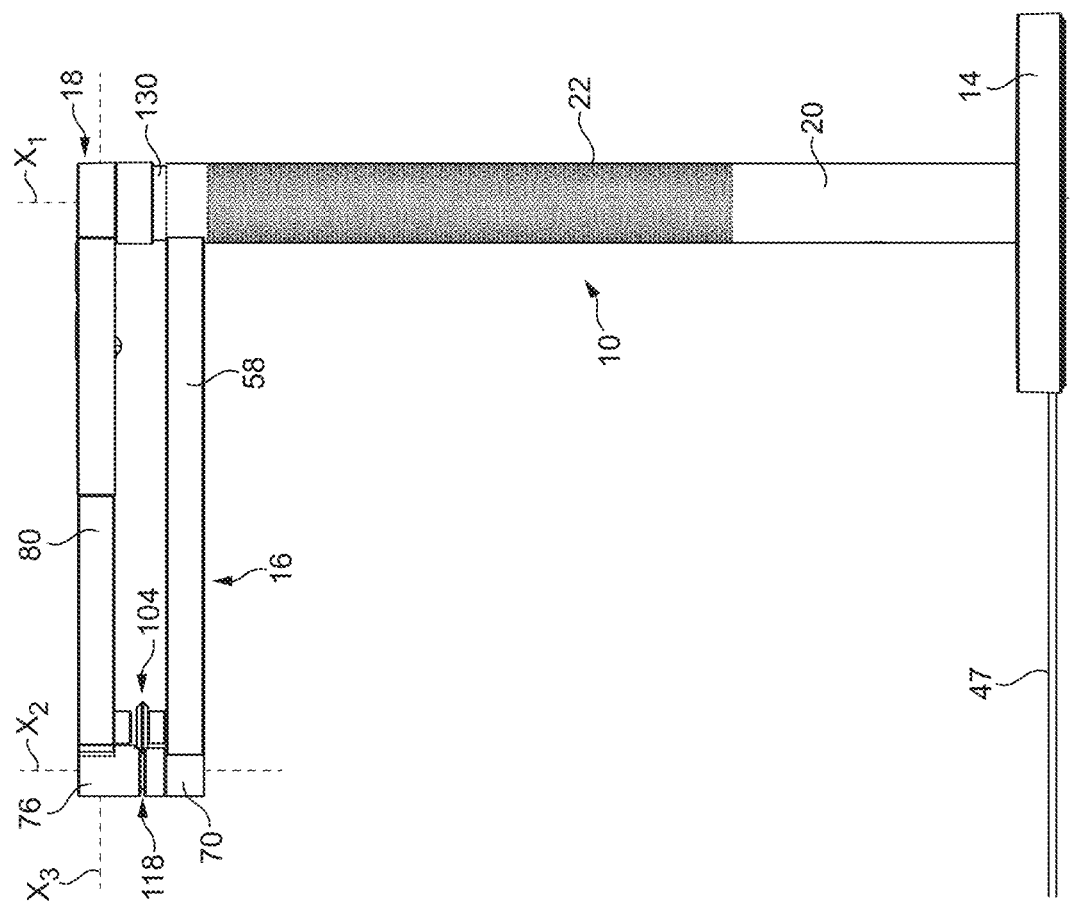
FIG. 3 is a front view of the lighting device as illustrated in FIG. 1.
Figure 2:
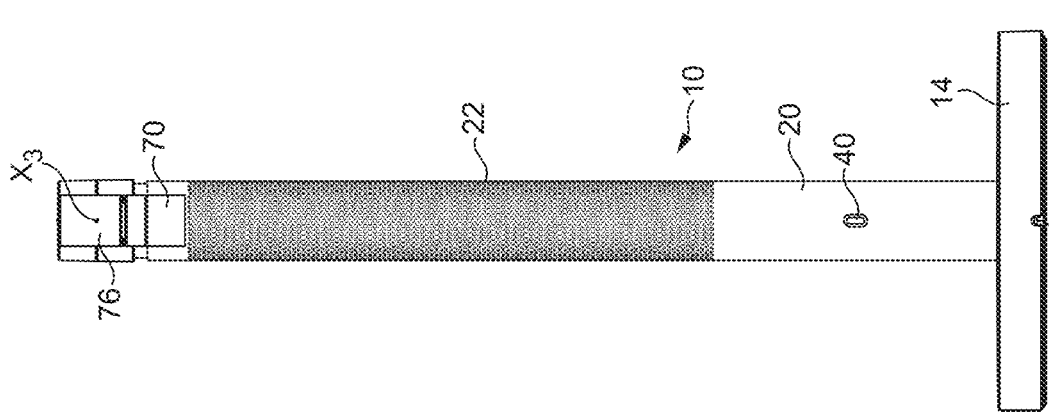
FIG. 2 is a side view of the lighting device as illustrated in FIG. 1.
Figure 9:
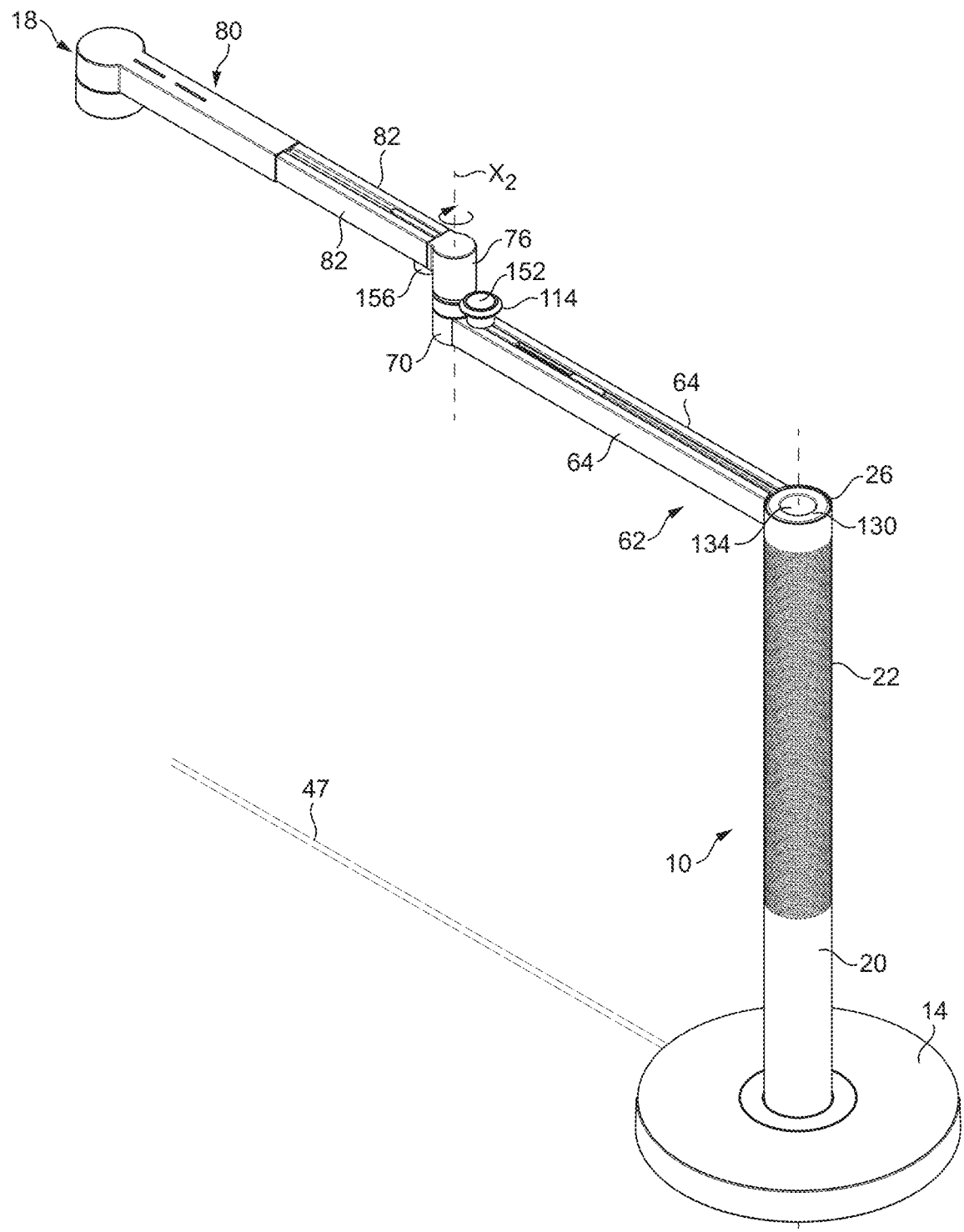
FIG. 9 is a perspective view, from above, of the lighting device, in which the lighting device is in a task lighting configuration.
Figure 10:
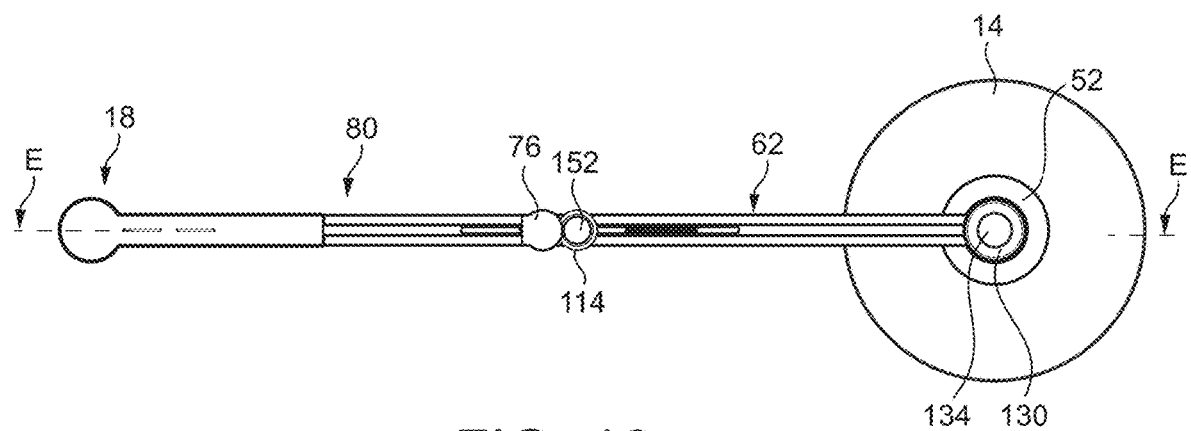
FIG. 10 is a top view of the lighting device illustrated in FIG. 9.
Figure 11:
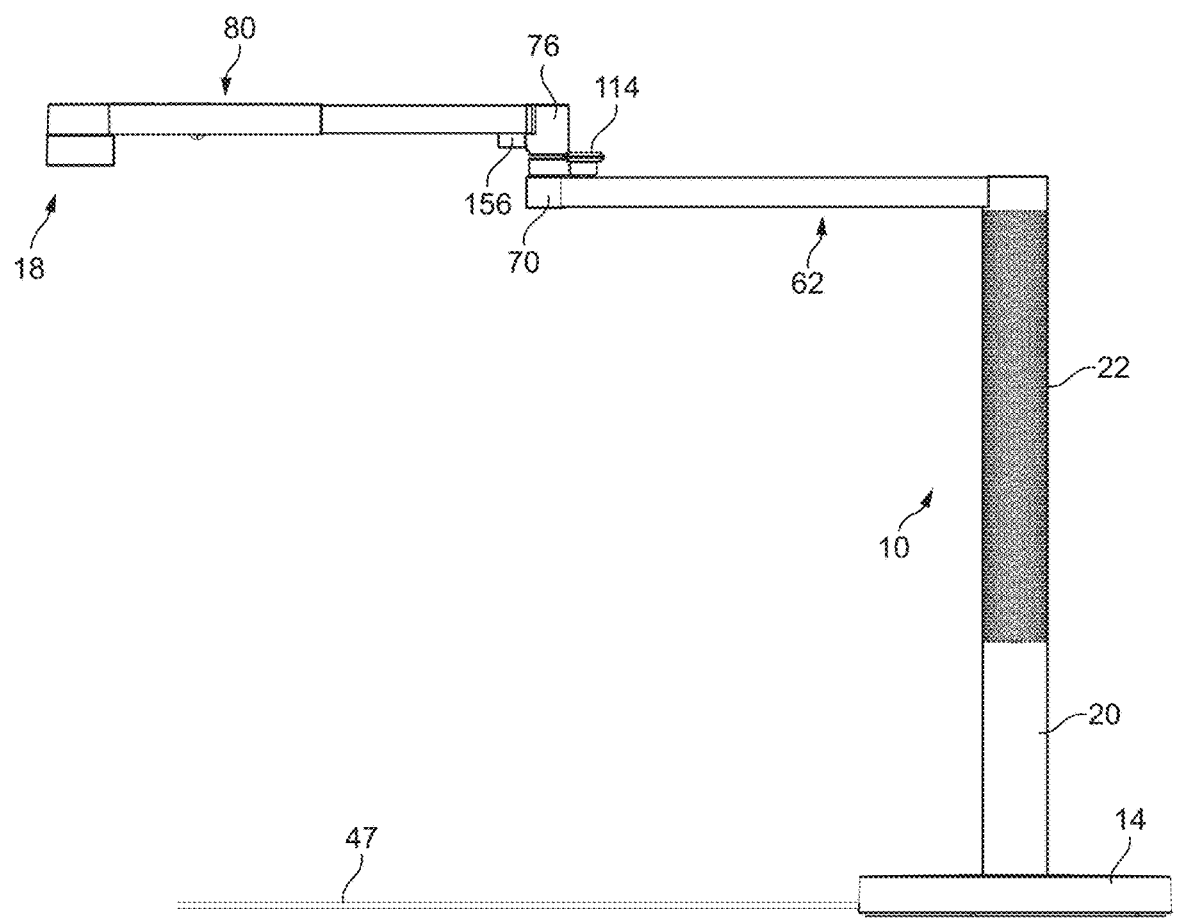
FIG. 11 is a front view of the lighting device as illustrated in FIG. 9.
Figure 12:
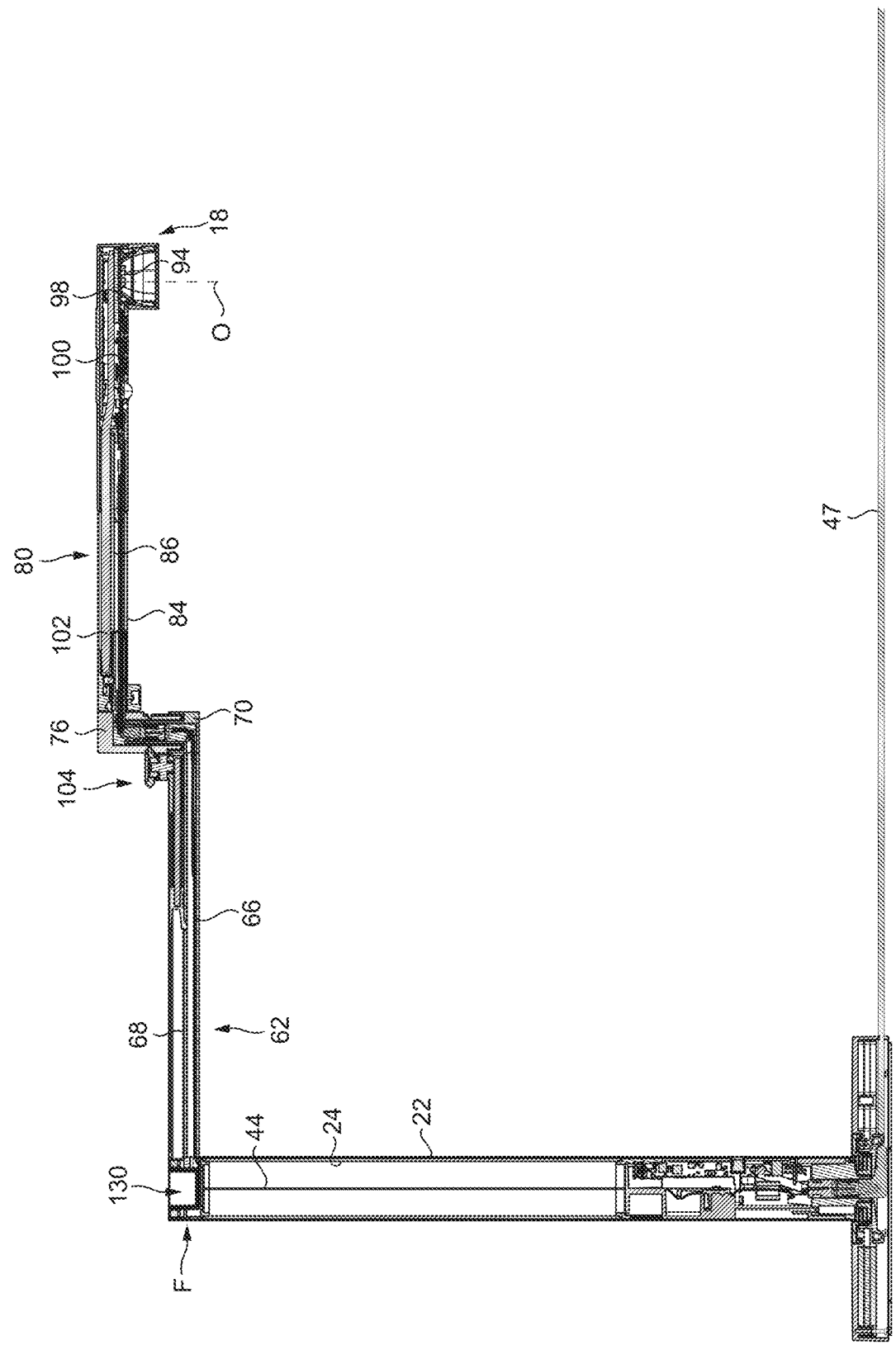
FIG. 12 is a sectional view taken along line E-E in FIG. 10.

With reference first to FIGS. 1 to 3, the body 12 comprises a tubular housing 20 which in this embodiment is in the form of a pipe having a constant circular cross-section. The housing 20 is mounted on the base 14 so that the longitudinal axis of the housing 20 extends orthogonal to the base 14, with the base 14 being shaped such that the housing 20 is vertical when the base 14 is located on a horizontal surface. In this embodiment, the housing 20 is formed from an opaque material, which may be a plastics or metallic material. The housing 20 includes a light permeable section in the form of a perforated section 22 which extends about the longitudinal axis of the body 12 and at least half way along the length of the body 12. In this embodiment, the body 12 further comprises a transparent tube 24 is surrounded by the perforated section 22 of the housing 20. The transparent tube 24 is preferably cylindrical. As shown in FIG. 9, the housing 20 has an open upper end 26 which is remote from the base 14, and which defines an aperture 28 through which light enters the body 12 from the light source 18. The upper end 26 of the housing 20 is located in a plane which is substantially orthogonal to the longitudinal axis of the housing 20.

Figure 6:
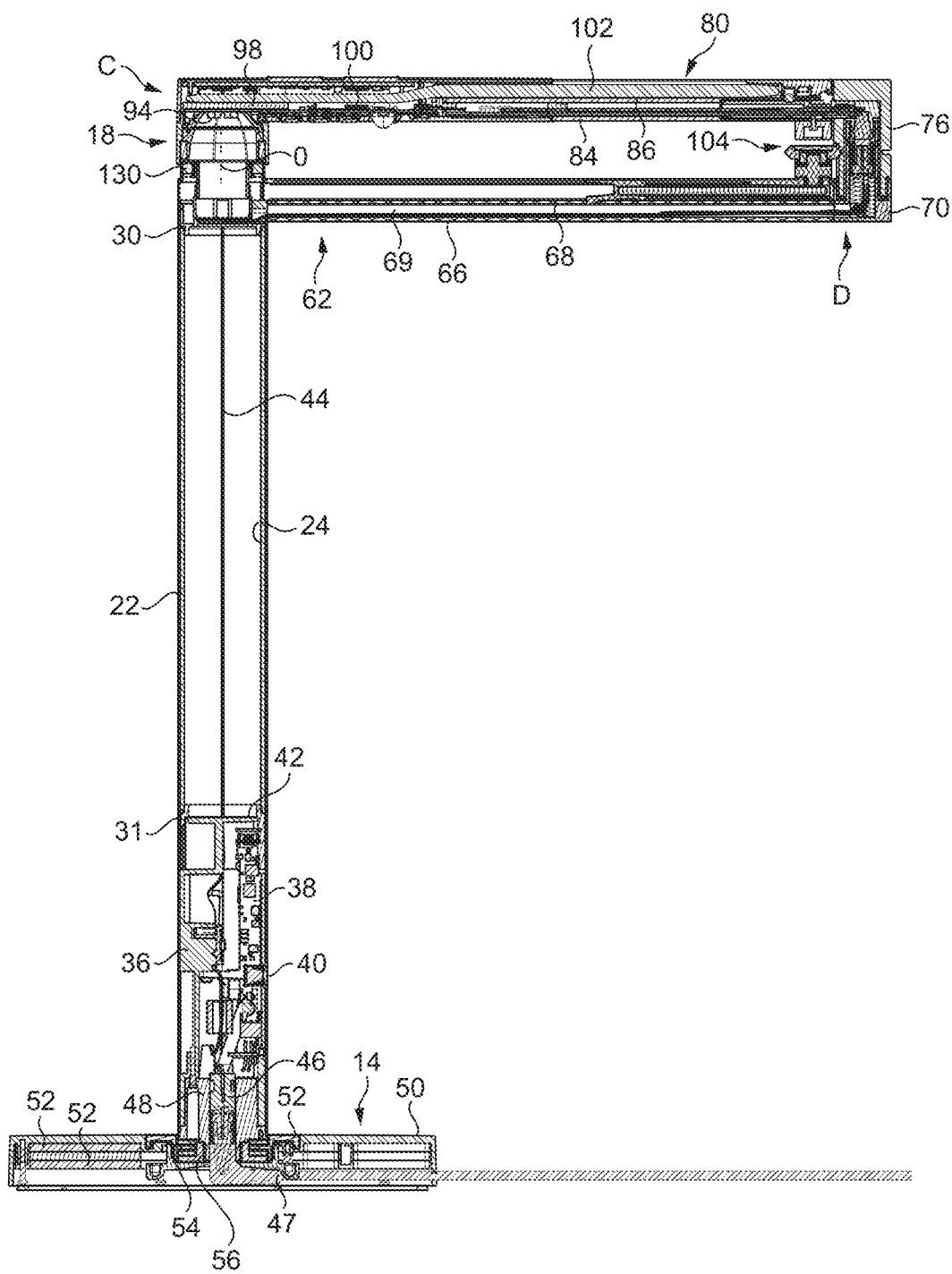
FIG. 6 is a sectional view taken along line B-B in FIG. 5.

With reference also to FIG. 6, the body 12 includes an annular upper body joint 30 and a lower body joint 31 which connect together the housing 20 and the transparent tube 24. The upper body joint 30 supports a filter 32 for filtering the light entering the body 12 from the light source 18, and a transparent filter cover 34. The lower body joint 31 is connected to a lower internal housing 36 of the body 12, which in this embodiment houses a circuit 38 for providing USB charging of an external device via USB port 40. The internal housing 36 also closes the lower end of the body 12 to inhibit light egress therefrom. A layer of reflective material 42 may be disposed on the upper end of the internal housing 36 to reflect incident light towards the perforated section 22 of the housing 20.

A first cable 44 for supplying power to the light source 18 extends through the body 12 and terminates at a cable jack 46. A mains power lead 47 is connected to the cable jack 46 to a further electrical contact located on the stop 30, to which a mains power supply may be connected. The cable jack 46 passes through a hollow shaft 48 of the base 14. The shaft 48 is connected by bolts to the lower body joint 31 of the body 12. The shaft 48 is mounted on a disc-shaped main body 50 of the base 14. The main body 50 of the base 14 may include weights 52 which prevent the device 10 from toppling during use.

The shaft 48 is mounted on the main body 50 of the base so that the shaft 48 can rotate relative to the main body 50 about a first axis $X_1$, which is collinear with the longitudinal axis of the body 12. This enables the body 12 to rotate relative to the base 14 about the first axis $X_1$. During assembly, the shaft 48 is received by an annular central section 52, which includes an inner annular flange 54. A threaded cap 56 is then secured to the lower end of the shaft 48 so that the inner annular flange 54 becomes sandwiched between the shaft 48 and the cap 56, which secures the body 12 to the base 14 whilst enabling the body 12 to rotate relative to the base 14 about the first axis $X_1$.

The support 16 is connected to the body 12 so that the support 16 extends outwardly from the body 12, preferably so that the support 16 is orthogonal to the longitudinal axis of the body 12. In this embodiment, the support 16 is connected to the upper end 26 of the body 12 by a collar 60 connected to the upper body joint 30 so that the support 16 thus rotates with the body 12 about the first axis $X_1$.

The support comprises a first arm 62 which is connected to the body 12 at a first end thereof. The first arm 62 comprises two parallel side walls 64, a lower wall 66 located perpendicularly between the lower ends of the side walls 64, and an upper wall 68 which is parallel to the lower wall 66, and located generally midway between the upper end and lower end of the side walls 64. A chamber 69 is located between the lower wall 66 and the upper wall 68. The cable 44 extends within the chamber 69 towards the light source 18.

A first joint section 70 of the support 16 is connected to the second end of the first arm 62, for example using an adhesive. The first joint section 70 comprises a generally cylindrical spigot 72 which, when the first joint section 70 is attached to the first arm 62, has a longitudinal axis which is parallel to the longitudinal axis of the body 12. A second cable jack 74 is housed within the spigot 72. A second joint section 76 is mounted on the first joint section 70 so that the second joint section 76 is rotatable relative to the first joint section 70 about a second axis $X_2$ which is collinear with the longitudinal axis of the spigot 72. The second joint section 76 is generally cylindrical in shape, and comprises a cylindrical recess which receives the spigot 72 as the second joint section 76 is mounted on the first joint section 70. The recess houses a third cable jack 78 which engages the second cable jack 74 as the second joint section 76 is mounted on the first joint section 70 to electrically connect the first cable 44 to a second cable 79 which extends towards the light source 18.

A second arm 80 of the support 16 is mounted on the second joint section 76 so that the second arm 80 pivots about the second axis $X_2$ with rotation of the second joint section 76 about that axis. Similar to the first arm 62, the second arm 80 comprises two parallel side walls 82, a lower wall 84 located perpendicularly between the lower ends of the side walls 82, and an upper wall 86 which is parallel to the lower wall 84, and located generally midway between the upper end and lower end of the side walls 82. The lower wall 84 and the upper wall 86 define a cylindrical recess which receives a hollow shaft 88 which extends outwardly from the second joint section 76 substantially orthogonal to the second axis $X_2$ so that the second arm 80 is substantially parallel to the first arm 62. This also enables the second arm 80 to rotate relative to the second joint section 76, and thus relative to the first arm 62, about a third axis $X_3$ which is orthogonal to, and which preferably intersects, the second axis $X_2$. The lower wall 84 and the upper wall 86 also define therebetween a chamber 90 which extends from the recess 88 to the second end of the second arm 80. The second cable 79 extends from the third cable jack 78 towards the light source 18 through the hollow shaft 88 and chamber 90.

Figure 7:
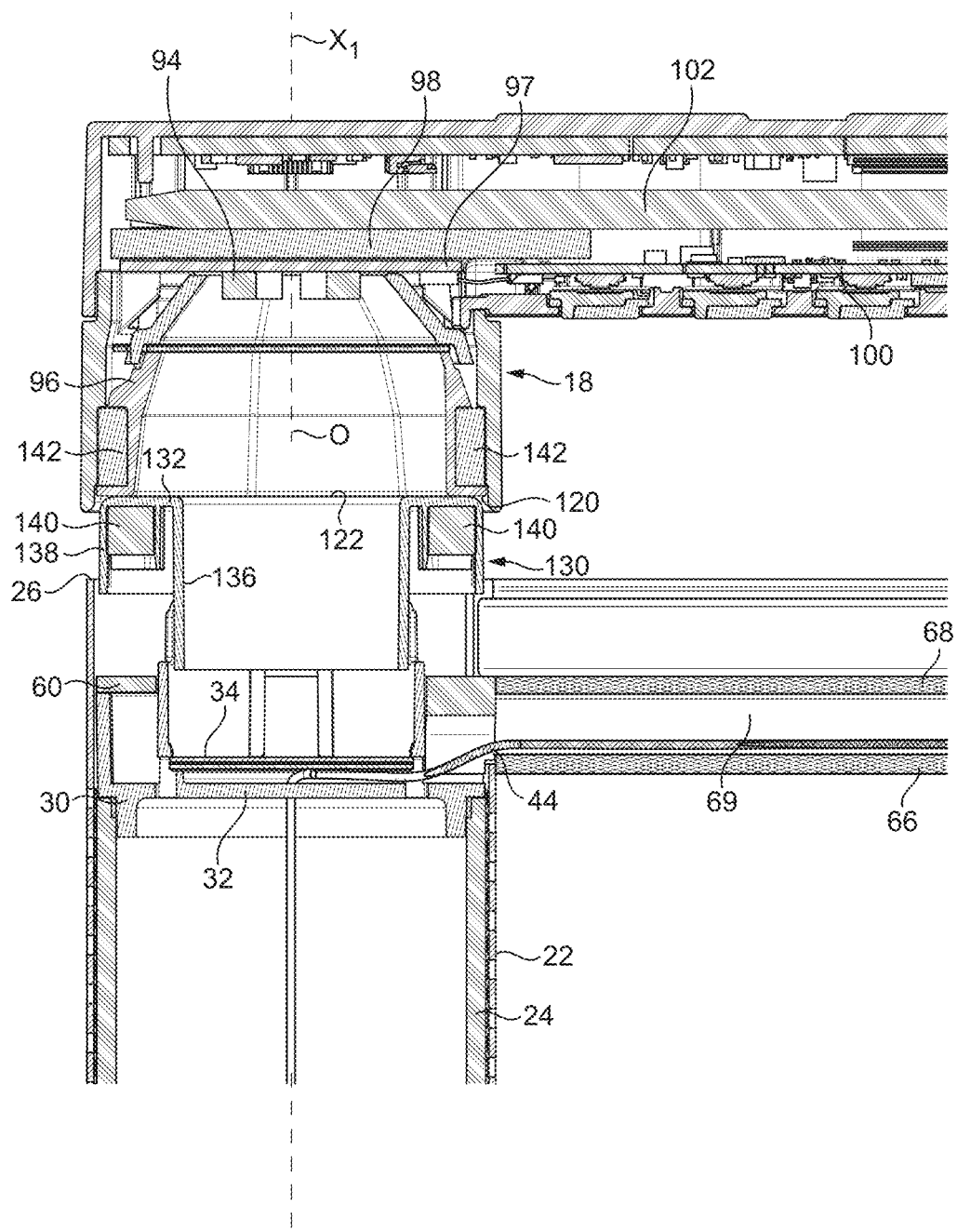
FIG. 7 is a close up of region C indicated in FIG. 6.

The light source 18 is mounted on the second end of the second arm 80. With reference to FIG. 7, the light source 18 comprises a plurality of light emitting diodes (LEDs) 94 centred on an optical axis O of the light source 18. The LEDs 94 are surrounded by a reflective baffle 96 for directing light emitted from the LEDs 94 away from the light source 18. The LEDs 94 are mounted on a board 97, which is in turn mounted on a heat conductive plate 98. The LEDs are connected electrically to a printed circuit board (PCB) 100, to which the second cable 79 is electrically connected. The heat conductive plate 98 is mounted on a heat pipe 102 so that heat emitted from the LEDs 94 during use of the lighting device 10 is transferred to the heat pipe 102. The heat pipe 102 protrudes outwardly from the light source 18, and is supported by the upper wall 86 of the second arm 80. Heat radiated from the heat pipe 102 during use of the lighting device 10 passes through an aperture located between the upper ends of the side walls 82 of the second arm 80 to enter the external environment.

Figure 4:
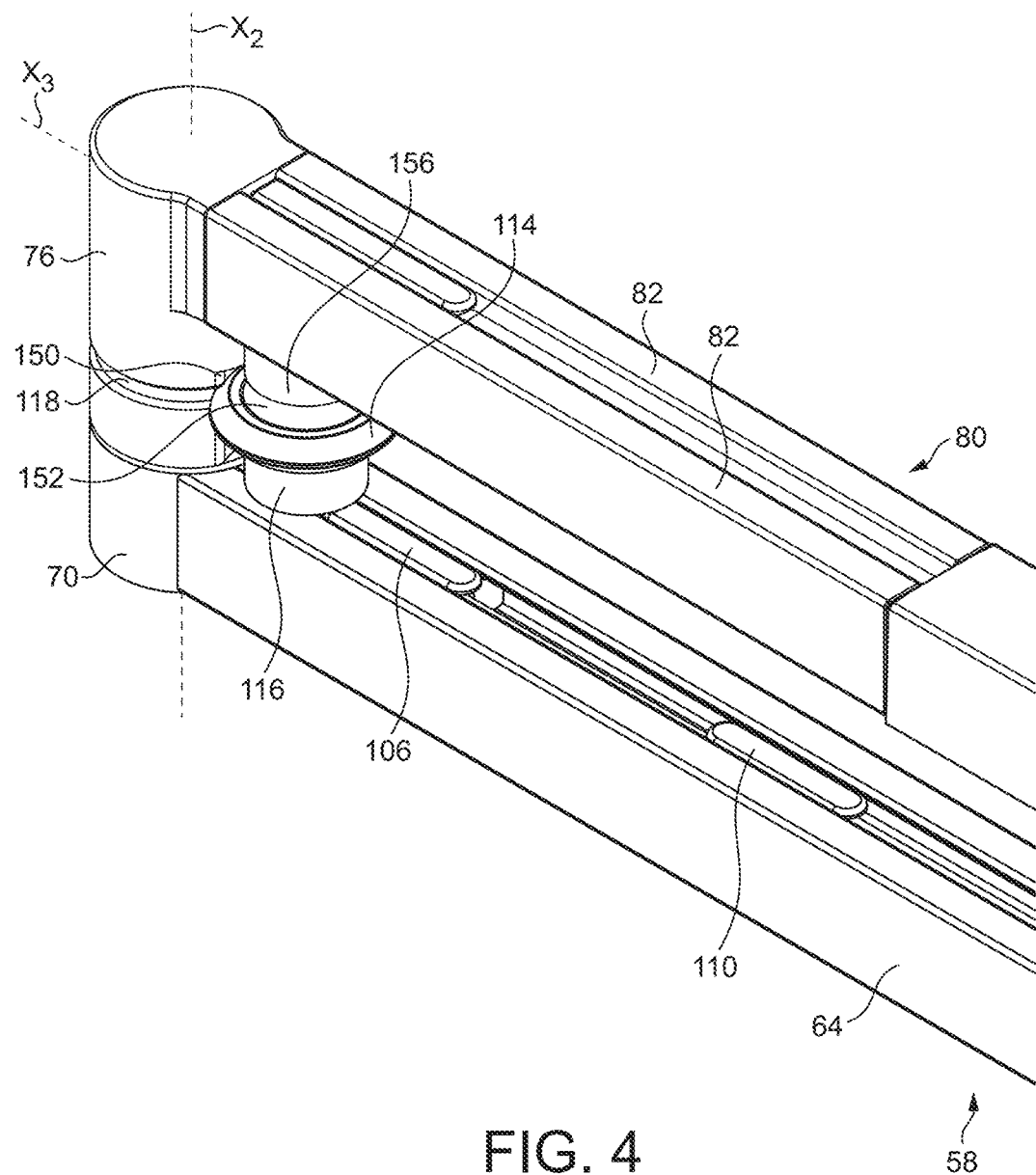
FIG. 4 is a close up of region A indicated in FIG. 1.
Figure 5:
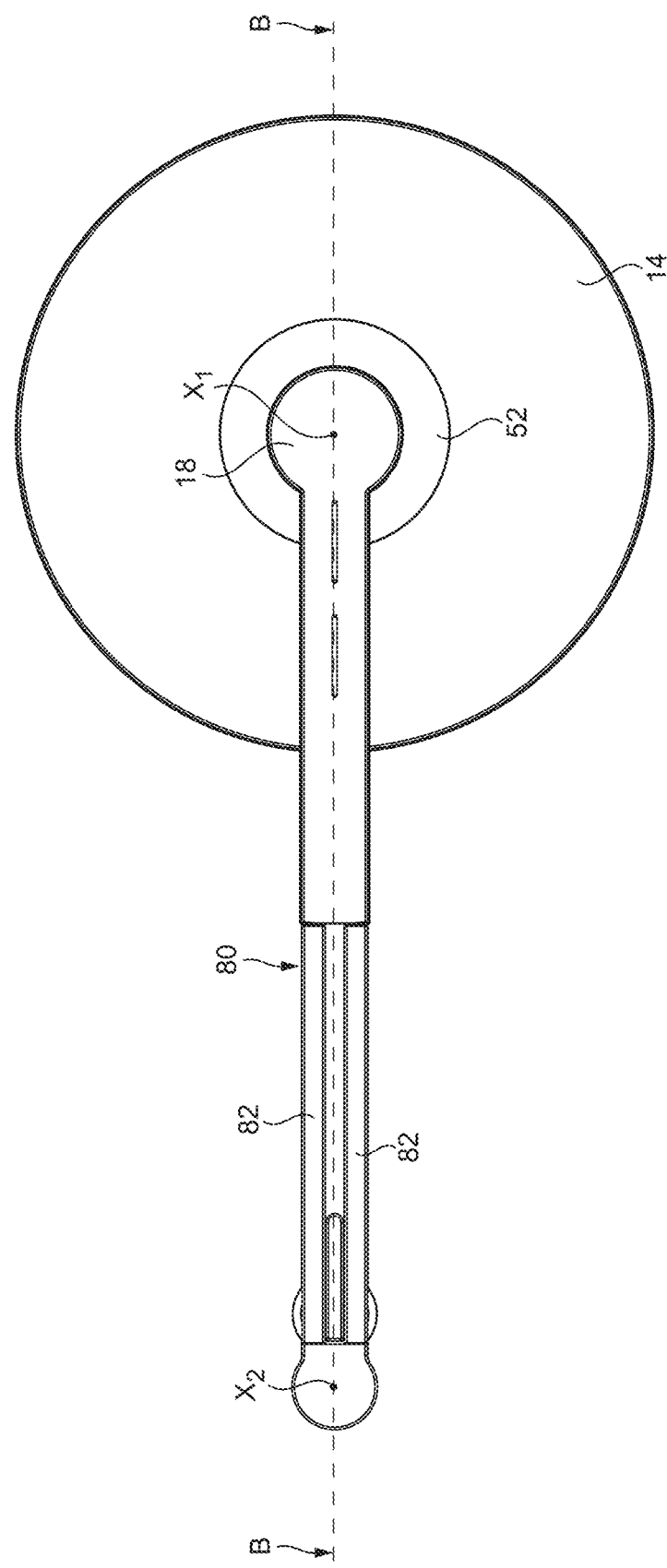
FIG. 5 is a top view of the lighting device as illustrated in FIG. 1.
Figure 8:
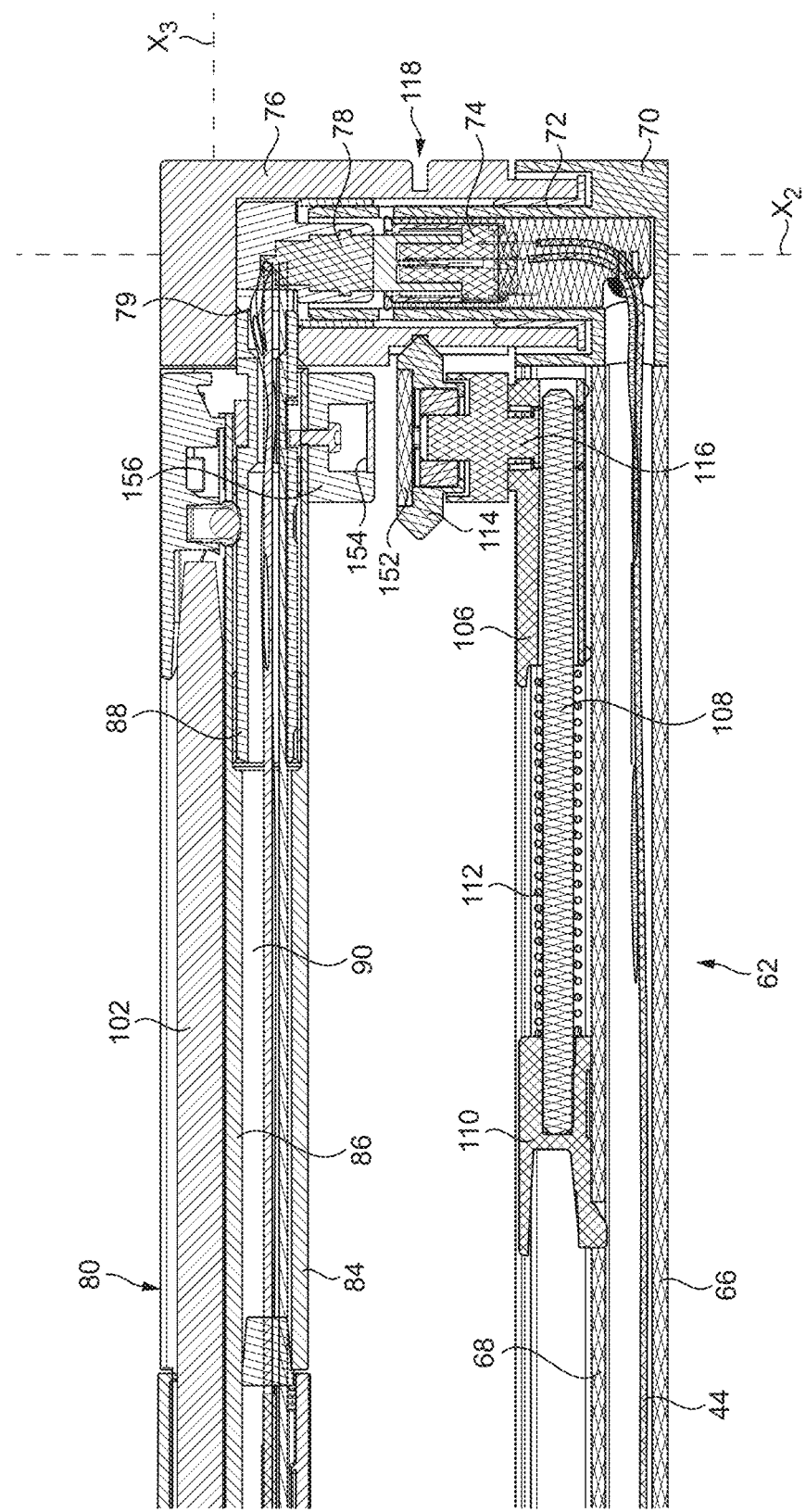
FIG. 8 is a close up of region D indicated in FIG. 6.

The second arm 80 is retained on the first arm 62 by a retaining mechanism 104. With particular reference to FIGS. 4 and 8, the retaining mechanism 104 comprises a detent 106 which is located on the upper wall 68 of the first arm 62, and which is moveable along a rod 108 which extends between the first joint section 70 and a stop member 110 attached to the upper wall 68. A compression spring 112 extending about the rod 108 urges the detent 106 away from the stop member 110. The detent 106 is connected to a roller 114 by a roller support 116 mounted on the detent 106. Under the action of the spring 112, the roller 114 is urged against the external cylindrical surface of the second joint section 76, so that the roller 114 enters a circular groove 116 extending about the second joint section 76 as the second joint section 76 is mounted on the first joint section. The engagement between the roller 114 and the groove 116 prevents the second arm from being lifted away from the first arm 62 during use of the lighting device 10.

The light source 18 is moveable relative to the body 12 to enable the lighting device 10 to adopt selectively either a first configuration, in which the light source 18 is positioned to illuminate the interior of the body 12 so that the external environment is illuminated by light emitted from the body 12, or a second configuration in which the light source 18 is positioned to illuminate directly the external environment. FIGS. 1 to 8 illustrate the lighting device 10 in the first, or "room lighting" configuration. In this first configuration, the second arm 80 is oriented relative to the first arm 62 so that the second arm 80 is parallel to, and substantially overlies, the first arm 62. In this configuration, the light source 18 is positioned directly over the open upper end 26 of the body 12 so that the optical axis O is collinear with the first axis $X_1$.

The support 16 is designed so that a lower annular wall 120 of the baffle 96, which defines the aperture 122 through which light is emitted from the light source 18 into the external environment, is spaced from the open upper end 26 of the body 12 when the lighting device 10 is in its first configuration. To guide the light emitted from the light source 18 into the body 12, the lighting device 10 includes a light guide 130 for guiding light emitted by the light source 18 into the body 12.

The light guide 130 is moveable relative to the body 12 between a deployed position, as shown in FIGS. 1 to 8, to guide light emitted from the light source 18 into the body 12 when the lighting device 10 is in the first configuration, and a stowed position, as shown in FIGS. 9 to 16, when the lighting device 10 is in a second configuration.

Figure 13:
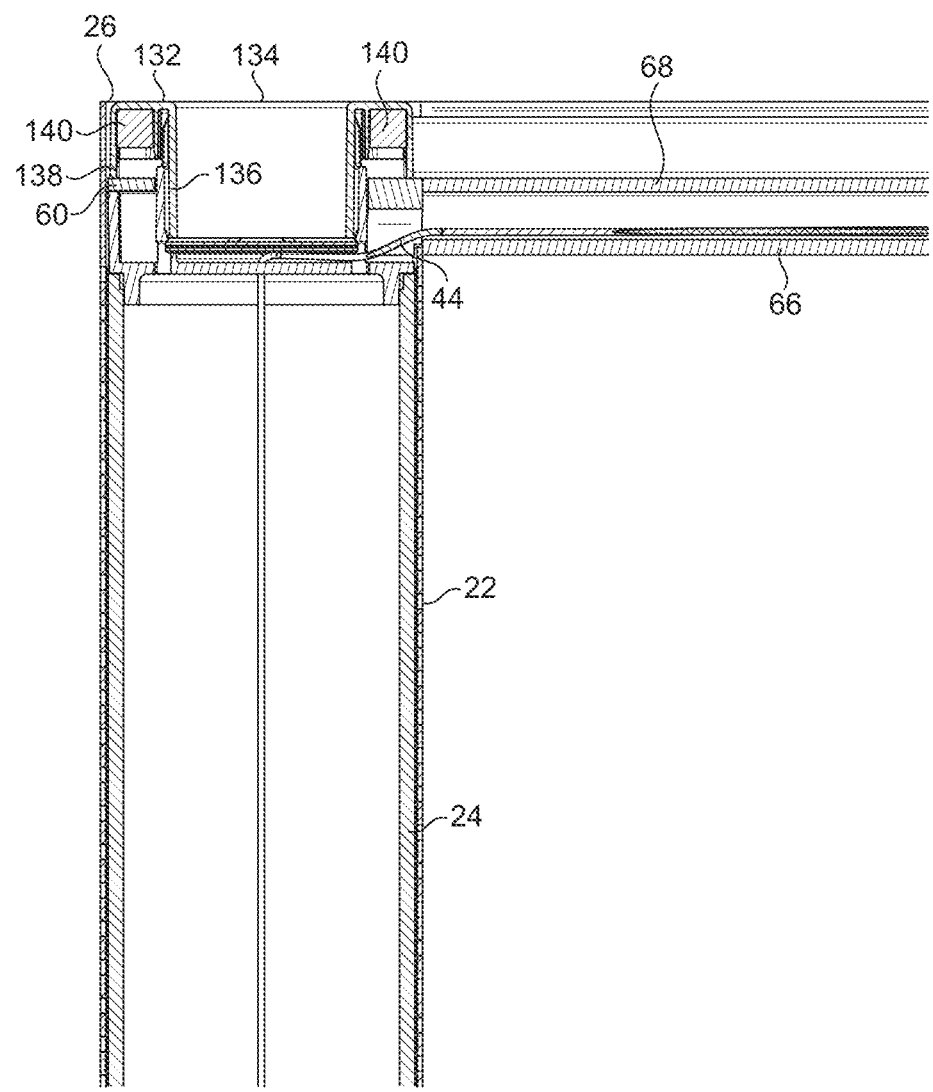
FIG. 13 is a close up of region F indicated in FIG. 12.

The light guide 130 is supported by the body 12 when in its stowed position. In this embodiment, the light guide 130 is supported by a ledge located inside the body 12, which in this embodiment is provided by the collar 60 which connects the support 16 to the body 12. Alternatively, a separate supporting ledge may be provided within the body 12. With particular reference to FIGS. 7 and 13, the light guide 130 comprises an annular wall 132 which faces towards the light source 18 when the lighting device 10 is in its first configuration, and which defines an aperture 134 through which light emitted from the light source 18 passes to enter the body 12. The light guide 130 further comprises an inner tubular wall 136 depending from the inner periphery of the annular wall 132 for guiding light into the body 12. The inner surface of the inner tubular wall 136 may comprise a reflective surface. The light guide 130 also comprises an outer tubular wall 138 depending from the outer periphery of the annular wall 132, which has an external diameter which is substantially the same as the internal diameter of the housing 22 of the body 12, and which slides along the internal surface of the housing 22 as the light guide 130 moves between its stowed position and deployed position.

As shown in FIG. 13, the light guide 130 is preferably located substantially fully within the body 12 when in its stowed position, more preferably so the upper surface of the light guide 130 is flush with the open upper end 26 of the body 12, so that the light guide 130 does not protrude from the body 12 when in its stowed position. However, the light guide 130 may protrude from the body 12 when in its stowed position provided that, when in its stowed position, it does not impair movement of the lighting device 10 between its first configuration and second configuration. However, when in its stowed position the light guide 130 is preferably located between the open upper end 26 of the body 12 and the perforated section 24 of the housing 22 so that it is not visible from a front, side or rear view of the body 12, as illustrated in FIGS. 9 to 16.

The light guide 130 moves away from the collar 60, and thus towards as the light source 12, as its moves from its stowed position to its deployed position. When in its deployed position, the light guide 130 preferably engages the light source 18 so that there is substantially no stray light emitted from the lighting device 10 as it passes from the light source 18 and into the body 12. The light is reflected by any reflective surface within the body 12 towards the perforated section 24 of the body 12, from which the light is emitted into the external environment.

The light guide 130 is preferably urged towards its deployed position as the lighting device 10 adopts its first configuration. In this embodiment, the upper surface of the annular wall 132 engages the lower annular wall 120 of the baffle 96 when the light guide is in its deployed position, as shown in FIG. 7. For example, the light guide 130 may be magnetically attracted towards the light source 18 as the lighting device 10 adopts its first configuration. As shown in FIG. 7, the light guide 130 compares a first pair of permanent magnets 140 which become attracted to a second pair of permanent magnets 142 carried by the light source 18 as the lighting device 10 adopts its first configuration. The strength of the magnetic field generated between the magnets 140, 142, is preferably such that the force of magnetic attraction between the magnets 140 142 is greater than the weight of the light guide 130 so that, as the lighting device 10 adopts its first configuration, the light guide 130 rises from the supporting collar 60 and becomes attached to the light source 18. When in its deployed position, the light guide 130 protrudes only partially from the body 12 so as to remain centred on the longitudinal axis of the body 12 as it moves between its stowed position and its deployed position.

From the first configuration, the second arm 80 may be rotated manually about the second axis $X_2$ so as to move the light source 18 laterally away from the open upper end 26 of the body 12, and so place the lighting device 10 in a second, "task lighting" configuration, in which the light emitted from the light source 10 can illuminate directly a work surface or other task area. By way of example, FIGS. 9 to 13 illustrate the lighting device 10 in a first tasking lighting configuration following a 180° rotation of the second arm 80 about the second axis $X_2$, in which the first arm 62 and the second arm 80 are substantially parallel and linearly arranged, and the light source 18 is located furthest from the body 12. When the lighting device 10 is in a task lighting configuration, the user may adjust the angular position of the light source 18 relative to the base 14 by rotating the body 12 about the first axis $X_1$.

Following a rotation of the second arm 80 about the second axis $X_2$, the optical axis O of the light source 18 remains substantially parallel to the longitudinal axis of the body 12. Such task lighting configurations are most useful for illuminating a task area on a work surface on which the lighting device 10 is located, and may be referred to as a downlighting configuration of the lighting device 10. At other times, the user may wish to illuminate other surfaces, such as reading material held by the user, or a wall or a ceiling of the room in which the lighting device 10 is located. In these instances, the user may change the orientation of the optical axis O of the light source 18 by rotating the second arm 80 about the third axis $X_3$.

Figure 14:
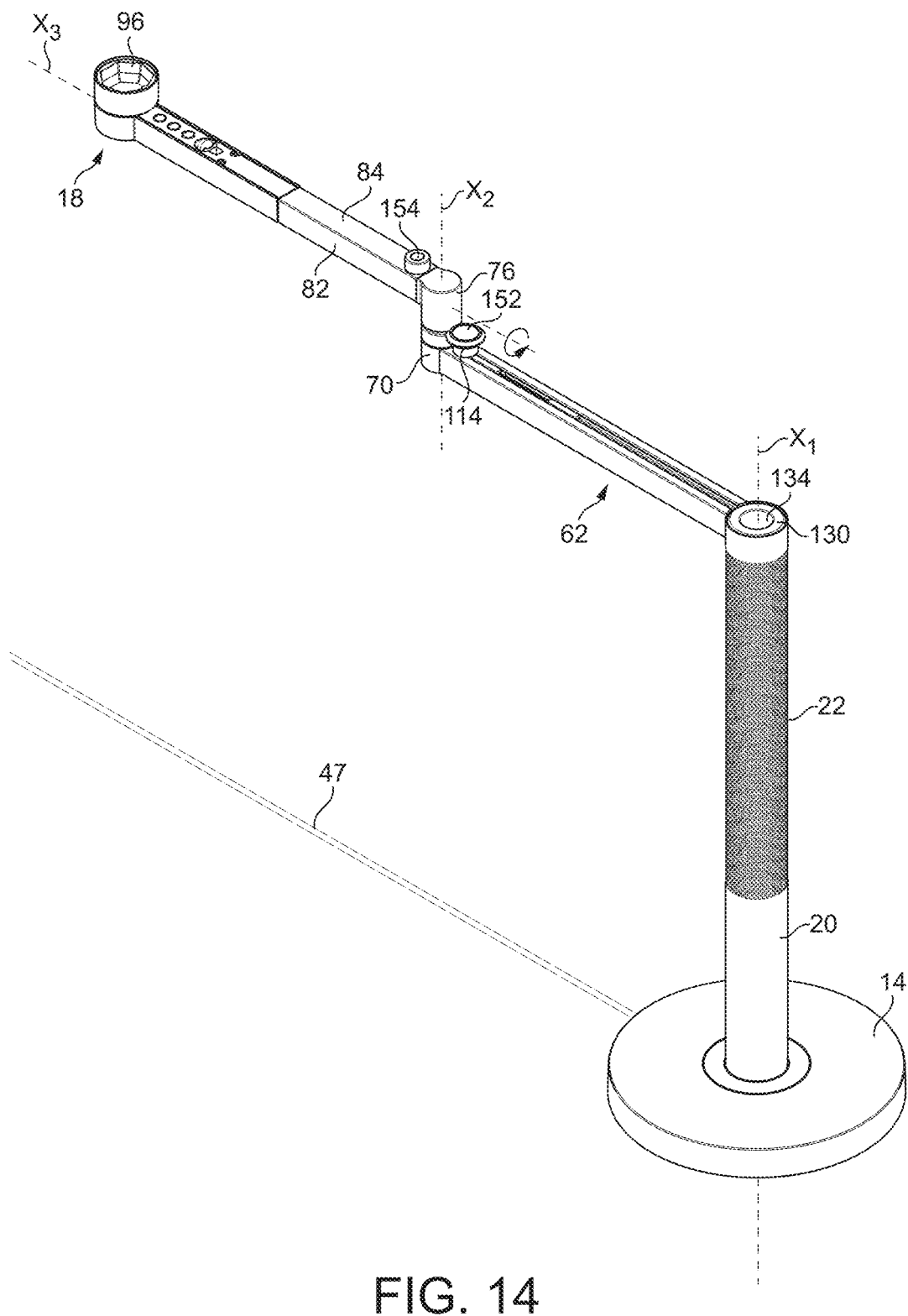
FIG. 14 is a perspective view, from above, of the lighting device, in which the lighting device is in an uplighting configuration.
Figure 15:
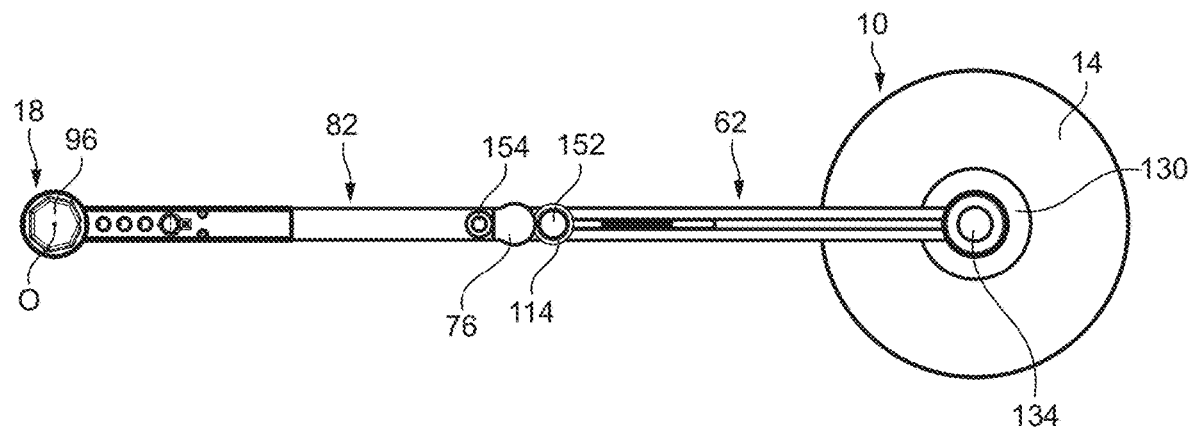
FIG. 15 is a top view of the lighting device illustrated in FIG. 14.
Figure 16:
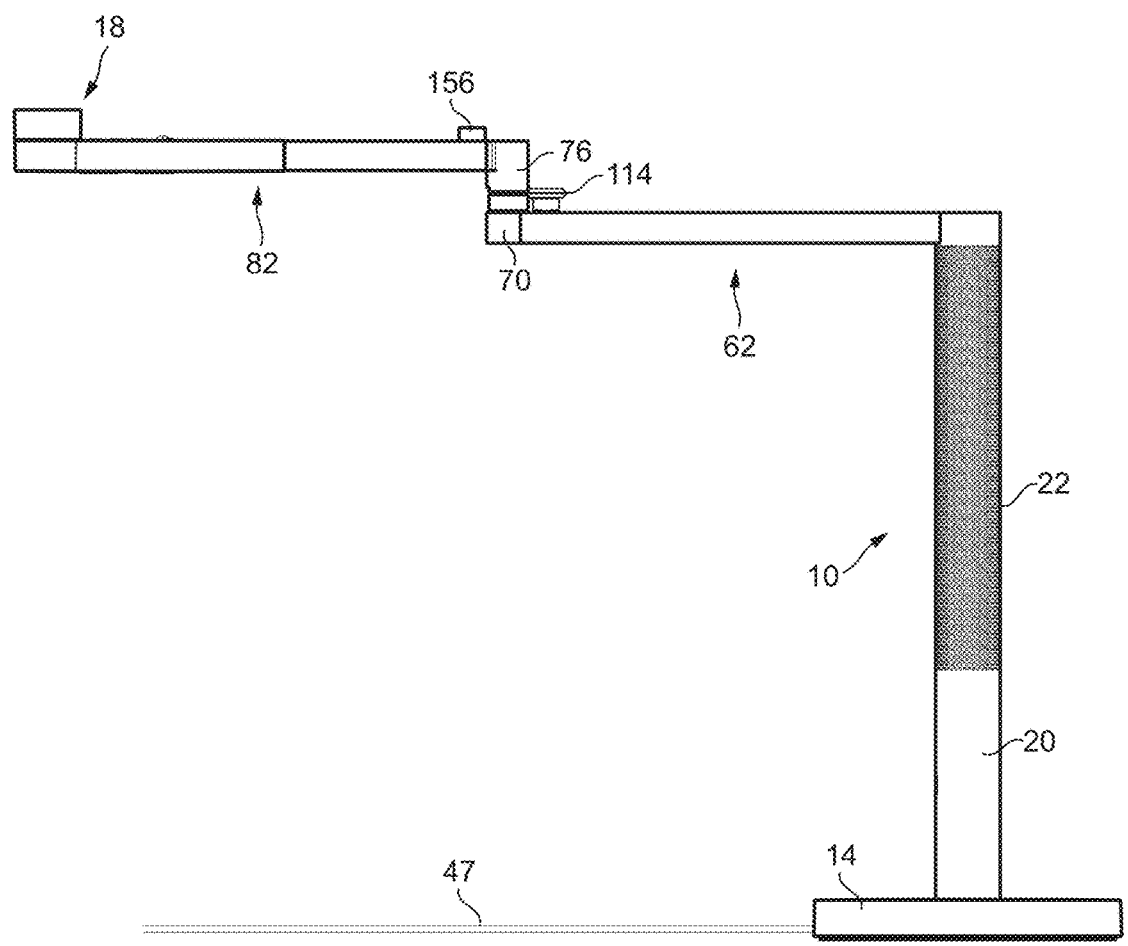
FIG. 16 is a front view of the lighting device as illustrated in FIG. 14.

For example, starting from the configuration shown in FIGS. 9 to 13, the user grasps the second arm 80 and rotates it about the hollow shaft 88, and thus about the third axis $X_3$, so that the optical axis O turns through 180°. As shown in FIGS. 14 to 16, in this uplighting configuration the optical axis O is parallel to the longitudinal axis of the body 12 but the light source 18 is facing away from the work surface on which the lighting device 10 is located.

From a second configuration, the lighting device 10 may be returned to the room lighting configuration by rotation of the second arm 80 about the second axis $X_2$ and the third axis $X_3$, as necessary. To ensure an accurate alignment of the light source 18 with the body 12 as the lighting device 10 returns to its room lighting configuration, the lighting device 10 includes a biasing mechanism for urging the lighting device 10 into its room lighting configuration as the light source 18 approaches the body 12. In this embodiment, the biasing mechanism comprises a concave recess 150 formed on the groove 118. The recess 150 is positioned on the track so that the roller 114 is located in the recess 150 when the lighting device 10 is in its first configuration. To ensure that the first arm 62 and second arm 80 are accurately aligned as the lighting device 10 approaches its first configuration, and so that the optical axis O is parallel with the first axis $X_1$, the biasing mechanism further comprises a first arm permanent magnet 152 connected to the first arm 62, and a second arm permanent magnet 154 connected to the second arm 80. In this embodiment, the first arm permanent magnet 152 is mounted on the roller 114, and the second arm permanent magnet 154 is mounted on a support 156 located directly above the roller 114 when the lighting device is in its first configuration. As the lighting device 10 moves towards its first configuration, the second arm permanent magnet 154 is attracted towards the first arm permanent magnet 152, which causes the second arm 80 to rotate towards the first arm 62 so that the first arm permanent magnet 152 and the second arm permanent magnet 154 are substantially parallel, and so the optical axis O is parallel with the first axis $X_1$. Simultaneously, the roller 114 beings to enter the recess 150 and, under the biasing force of the spring 112, urges the second joint section 76 to rotate about the second axis $X_2$ until the roller 114 has fully entered the recess 150, and the lighting device 10 has been returned to its first configuration. When the lighting device 10 is subsequently moved from its first configuration to a second configuration, by rotating the second arm about the second axis $X_2$, the second pair of permanent magnets 142 carried by the light source 18 move away from the first pair of permanent magnets 140 carried by the light guide 130, as the movement of the light guide 130 is constrained along the longitudinal axis of the body 12. As the pairs of magnets become spaced apart, the force of attraction between the magnets reduces so that the light guide 130 falls from the light source 130 and on to the collar 60, and so returns to its stowed position.

The invention claimed is:

1. A lighting device comprising:
   a body having an aperture through which light enters the body;
   a light source pivotably connected to the body to enable the lighting device to adopt selectively one of a first configuration in which the light source is positioned to illuminate the interior of the body, and a second configuration in which the light source is laterally spaced from the aperture; and
   a light guide moveable relative to the body between a stowed position and a deployed position to guide into the body light emitted from the light source when the device is in its first configuration.

2. The device according to claim 1, wherein, when in its stowed position, the light guide is supported by the body.

3. The device according to claim 1, wherein, when in its stowed position, the light guide is located at least partially within the body.

4. The device according to claim 1, wherein, when in its stowed position, the light guide is located substantially fully within the body.

5. The device according to claim 1, wherein the light guide moves towards the light source as it moves from its stowed position to its deployed position.

6. The device according to claim 1, wherein the body comprises an open end defining said aperture, and wherein, when in its deployed position, the light guide protrudes from the open end of the body.

7. The device according to claim 1, wherein the light guide engages the light source when in its deployed position.

8. The device according to claim 1, wherein the light guide is arranged to engage a wall of the light source which faces towards the body when the device is in its first configuration.

9. The device according to claim 8, wherein the light source comprises a light emitting device and a baffle defining an aperture through which light is emitted from the light source, and wherein the baffle comprises an annular wall which faces towards the body when the device is in its first configuration, and wherein the light guide is arranged to engage the annular wall of the baffle.

10. The device according to claim 9, wherein the light guide comprises an annular wall for engaging the light source, and a tubular wall depending from an inner periphery of the annular wall for guiding light into the body.

11. The device according to claim 10, wherein the light guide comprises a tubular wall depending from the outer periphery of the annular wall and which slides along an inner surface of the body as the light guide moves between its stowed position and deployed position.

12. The device according to claim 1, wherein the light guide is attached to the light source when in its deployed configuration.

13. The device according to claim 1, comprising means for urging the light guide towards its deployed position as the lighting device adopts its first configuration.

14. The device according to claim 13, wherein the urging means is configured to magnetically attract the light guide towards its deployed position as the lighting device adopts its first configuration.

15. The device according to claim 14, wherein the light source comprises at least one permanent magnet.

16. The device according to claim 1, wherein the body is in the form of a tube.

17. The device according to claim 1, wherein the light source is connected to a support.

18. The device according to claim 17, wherein the support is substantially orthogonal to a longitudinal axis of the body.

19. The device according to claim 17, wherein the support is connected to the body.

20. The device according to claim 19, wherein the support comprises a first arm which is connected to the body, and a second arm which supports the light source and which is moveable relative to the first arm.

21. The device according to claim 20, wherein the support comprises a joint section for connecting the second arm to the first arm, the joint section being moveable with second arm relative to the first arm, and wherein the second arm is moveable relative to the joint section.

22. The device according to claim 1, comprising a biasing mechanism for urging the lighting device towards its first configuration depending on the position of the light source relative to the body.

23. The device according to claim 22, wherein the biasing mechanism comprises means for urging the light source towards an orientation such that the optical axis of the light source is substantially parallel to the longitudinal axis of the body.

24. The device according to claim 23, wherein the means for urging is configured to magnetically urge the light source towards said orientation.

25. The device according to claim 24, wherein the support comprises a first arm which is connected to the body, and a second arm, which supports the light source and which is moveable relative to the first arm, and wherein the means for urging comprises a first permanent magnet connected to the first arm, and a second permanent magnet connected to the second arm.

26. A lighting device comprising:
a body having an aperture through which light enters the body;
a light source moveable relative to the body to enable the lighting device to adopt selectively one of a first configuration in which the light source is positioned to illuminate the interior of the body, and a second configuration in which the light source is laterally spaced from the aperture; and
a light guide moveable relative to the body and to the light source between a stowed position and a deployed position to guide into the body light emitted from the light source when the device is in its first configuration.

* * * * *